United States Patent
Luo et al.

(10) Patent No.: US 10,177,871 B2
(45) Date of Patent: Jan. 8, 2019

(54) HIGH DATA RATE EXTENSION WITH BONDING

(71) Applicant: Futurewei Technologies, Inc., Plano, TX (US)

(72) Inventors: Yuanqiu Luo, Cranbury, NJ (US); Frank Effenberger, Colts Neck, NJ (US); Duane Remein, Raleigh, NC (US)

(73) Assignee: Futurewei Technologies, Inc., Plano, TX (US)

( * ) Notice: Subject to any disclaimer, the term of this patent is extended or adjusted under 35 U.S.C. 154(b) by 139 days.

(21) Appl. No.: 15/205,930

(22) Filed: Jul. 8, 2016

(65) Prior Publication Data

US 2017/0012731 A1    Jan. 12, 2017

Related U.S. Application Data

(60) Provisional application No. 62/191,148, filed on Jul. 10, 2015.

(51) Int. Cl.
*H04B 10/27*   (2013.01)
*H04J 14/02*   (2006.01)
(Continued)

(52) U.S. Cl.
CPC .......... *H04J 14/023* (2013.01); *H04J 3/1694* (2013.01); *H04L 12/4633* (2013.01); *H04L 69/22* (2013.01)

(58) Field of Classification Search
CPC ..... H04Q 11/0067; H04J 3/1694; H04J 14/08
See application file for complete search history.

(56) References Cited

U.S. PATENT DOCUMENTS 8,208,815 B1 * 6/2012 Chiang ................. H04J 3/0682
                                                               398/155
9,762,349 B1 * 9/2017 Dai ..................... H04J 14/0226
(Continued)

FOREIGN PATENT DOCUMENTS

CN       103856836 A     6/2014
WO    2014187538 A1    11/2014

OTHER PUBLICATIONS

Foreign Communication From A Counterpart Application, PCT Application No. PCT/CN2016/089626, International Search Report dated Oct. 18, 2016, 4 pages.
(Continued)

*Primary Examiner* — David C Payne
*Assistant Examiner* — Tanya T Motsinger
(74) *Attorney, Agent, or Firm* — Conley Rose, P.C.

(57) ABSTRACT

A method of fragmented packet transmission in a multiple-channel passive optical network (PON), comprising fragmenting, by a Gigabit-PON encapsulation method (GEM)/next generation-PON encapsulation method (XGEM) engine of a network element, data into a plurality of packet fragments; encapsulating, by the GEM/XGEM engine, the plurality of packet fragments into frames; scheduling, by a bonding block of the network element, transmission of the frames on a plurality of channels, wherein an order for transmitting the frames is based in part on channel availability; and transmitting, by a transmitter of the network element, the frames to a receiver on the plurality of channels according to the scheduling.

14 Claims, 9 Drawing Sheets

(51) Int. Cl.
*H04J 3/16* (2006.01)
*H04L 12/46* (2006.01)
*H04L 29/06* (2006.01)

(56) References Cited

U.S. PATENT DOCUMENTS

| | | | | |
|---|---|---|---|---|
| 9,924,248 | B2* | 3/2018 | Detwiler | H04B 10/27 |
| 2002/0165978 | A1* | 11/2002 | Chui | H04Q 11/0005 |
| | | | | 709/238 |
| 2006/0126505 | A1* | 6/2006 | Denney | H04J 3/1694 |
| | | | | 370/229 |
| 2006/0187834 | A1 | 8/2006 | Nichols et al. | |
| 2007/0116466 | A1* | 5/2007 | Gewirtzman | H04J 3/1694 |
| | | | | 398/71 |
| 2007/0269212 | A1 | 11/2007 | Remein et al. | |
| 2008/0162922 | A1 | 7/2008 | Swartz | |
| 2008/0219157 | A1* | 9/2008 | Lakshminaraya | H04J 3/1694 |
| | | | | 370/229 |
| 2008/0260385 | A1 | 10/2008 | Eguchi | |
| 2009/0034973 | A1* | 2/2009 | Sakamoto | H04L 25/063 |
| | | | | 398/58 |
| 2009/0067850 | A1* | 3/2009 | Mizutani | H04J 3/0605 |
| | | | | 398/154 |
| 2011/0150463 | A1* | 6/2011 | Zhou | H04L 12/2865 |
| | | | | 398/25 |
| 2011/0165174 | A1* | 7/2011 | Murphy | C12Q 1/6809 |
| | | | | 424/172.1 |
| 2011/0211834 | A1* | 9/2011 | Ansari | H04J 14/0282 |
| | | | | 398/58 |
| 2012/0149418 | A1* | 6/2012 | Skubic | H04L 47/2416 |
| | | | | 455/509 |
| 2013/0010585 | A1* | 1/2013 | Chu | H04B 3/32 |
| | | | | 370/201 |
| 2013/0202112 | A1* | 8/2013 | Bernard | H04Q 11/0067 |
| | | | | 380/287 |
| 2013/0202113 | A1* | 8/2013 | Bernard | H04Q 11/0067 |
| | | | | 380/287 |
| 2014/0186039 | A1* | 7/2014 | Luo | H04L 12/2861 |
| | | | | 398/66 |
| 2016/0088377 | A1* | 3/2016 | Peng | H04L 41/0803 |
| | | | | 398/45 |
| 2017/0155983 | A1* | 6/2017 | Detwiler | H04B 10/27 |
| 2017/0302379 | A1* | 10/2017 | Bernard | H04B 10/27 |

OTHER PUBLICATIONS

"Series G: Transmission Systems and Media, Digital Systems and Networks, Digital sections and digital line systems—Optical line systems for local and access networks, 10-Gigabit-capable passive optical networks (XG-PON): Transmission convergence (TC) layer specification," ITU-T, G.987.3, Jan. 2014, 146 pages.

"Series G: Transmission Systems and Media, Digital Systems and Networks, Digital sections and digital line systems—Optical line systems for local and access networks, 40-Gigabit-capable passive optical networks (NG-PON2): Transmission convergence layer specifications," ITU-T, G.989.3, Oct. 2015, 250 pages.

"Series G: Transmission Systems and Media, Digital Systems and Networks, Digital sections and digital line system—Optical line systems for local and access networks, 40-Gigabit-capable passive optical networks (NG-PON2): General requirements, Amendment 1," ITU-T, G.989.1, Amendment 1, Aug. 2015, 22 pages.

"Series G:Transmission Systems and Media, Digital Systems and Networks, Digital sections and digital line system—Optical line systems for local and access networks, Gigabit-capable Passive Optical Networks (G-PON): ONT management and control interface specifcation," ITU-T, G.984A, Part 1, Feb. 2008, 2015 pages.

"Series G:Transmission Systems and Media, Digital Systems and Networks, Digital sections and digital line system—Optical line systems for local and access networks, Gigabit-capable Passive Optical Networks (G-PON): ONT management and control interface specifcation," ITU-T, G.984.4, Part 2, Feb. 2008, 215 pages.

"Series G:Transmission Systems and Media, Digital Systems and Networks, Digital sections and digital line system—Optical line systems for local and access networks, 10-Gigabit-capable passive optical networks (XG-PON): Transmission convergence (TC) layer specification," ITU-T G.987.3, Oct. 2010, 134 pages.

Foreign Communication From A Counterpart Application, European Application No. 16823860.8, Extended European Search Report dated Jun. 6, 2018, 10 pages.

* cited by examiner

Step 1- Sorting channels per available time

Step 2- Scheduling bonded traffic transmission

Receiver buffer for enforcing frame order

Enforcing received frame order via delay-optimized fragmentation

HIGH DATA RATE EXTENSION WITH BONDING

CROSS-REFERENCE TO RELATED APPLICATIONS

This application claims the benefit of U.S. Provisional Application No. 62/191,148, filed on Jul. 10, 2015, entitled "High Data Rate Extension With Bonding," which is hereby incorporated by reference in its entirety.

BACKGROUND

A passive optical network (PON) is one system for providing network access over the last mile, which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity is shared among multiple users using a time-division multiple access (TDMA) scheme, so the average bandwidth for each user may be limited to below 100 megabits per second (Mb/s).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT. Next-generation PONs (NG-PONs) and NG-PON2s may include point-to-point WDM PONs (P2P-WDM PONs), which may provide data rates higher than 10 Gb/s.

NG-PONs and NG-PON2s may also include time- and wavelength-division multiplexing (TWDM) PONs, which may also provide data rates higher than 10 Gb/s. TWDM PONs may combine TDMA and WDMA to support higher capacity so that an increased number of users can be served by a single OLT with sufficient bandwidth per user. In a TWDM PON, a WDM PON may be overlaid on top of a TDM PON. In other words, different wavelengths may be multiplexed together to share a single feeder fiber, and each wavelength may be shared by multiple users using TDMA.

SUMMARY

A network element configured to generate a multiple-channel passive optical network (PON) layer can comprise a non-transitory memory storage comprising instructions; one or more processors in communication with the memory, wherein the one or more processors execute the instructions to: fragment data into a plurality of packet fragments; encapsulate the plurality of packet fragments into one or more frames; and schedule transmission of the one or more frames on a plurality of channels via a transmission schedule, wherein an order for transmitting the frames is based in part on channel availability; and a transmitter in communication with the one or more processors and configured to transmit the one or more frames on the plurality of channels according to the transmission schedule.

A method of fragmented packet transmission in a multiple-channel passive optical network (PON) is provided, including fragmenting, by a Gigabit-PON encapsulation method (GEM)/next generation-PON encapsulation method (XGEM) engine of a network element, data into a plurality of packet fragments, encapsulating, by the GEM/XGEM engine, the plurality of packet fragments into frames, scheduling, by a bonding block of the network element, transmission of the frames on a plurality of channels, wherein an order for transmitting the frames is based in part on channel availability, and transmitting, by a transmitter of the network element, the frames to a receiver on the plurality of channels according to the scheduling.

On the receiving end of the multiple-channel transmissions, a method of fragmented packet reception in a multiple-channel PON can comprise receiving, at a receiver, a plurality of encapsulated packet fragments over a plurality of channels, wherein each fragment of the plurality of packet fragments comprises a header; assembling the plurality of packet fragments according to an arrival time of respective headers of the plurality of packet fragments; and buffering, by a processor, the plurality of packet fragments in a sequence based on the arrival times of the headers.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
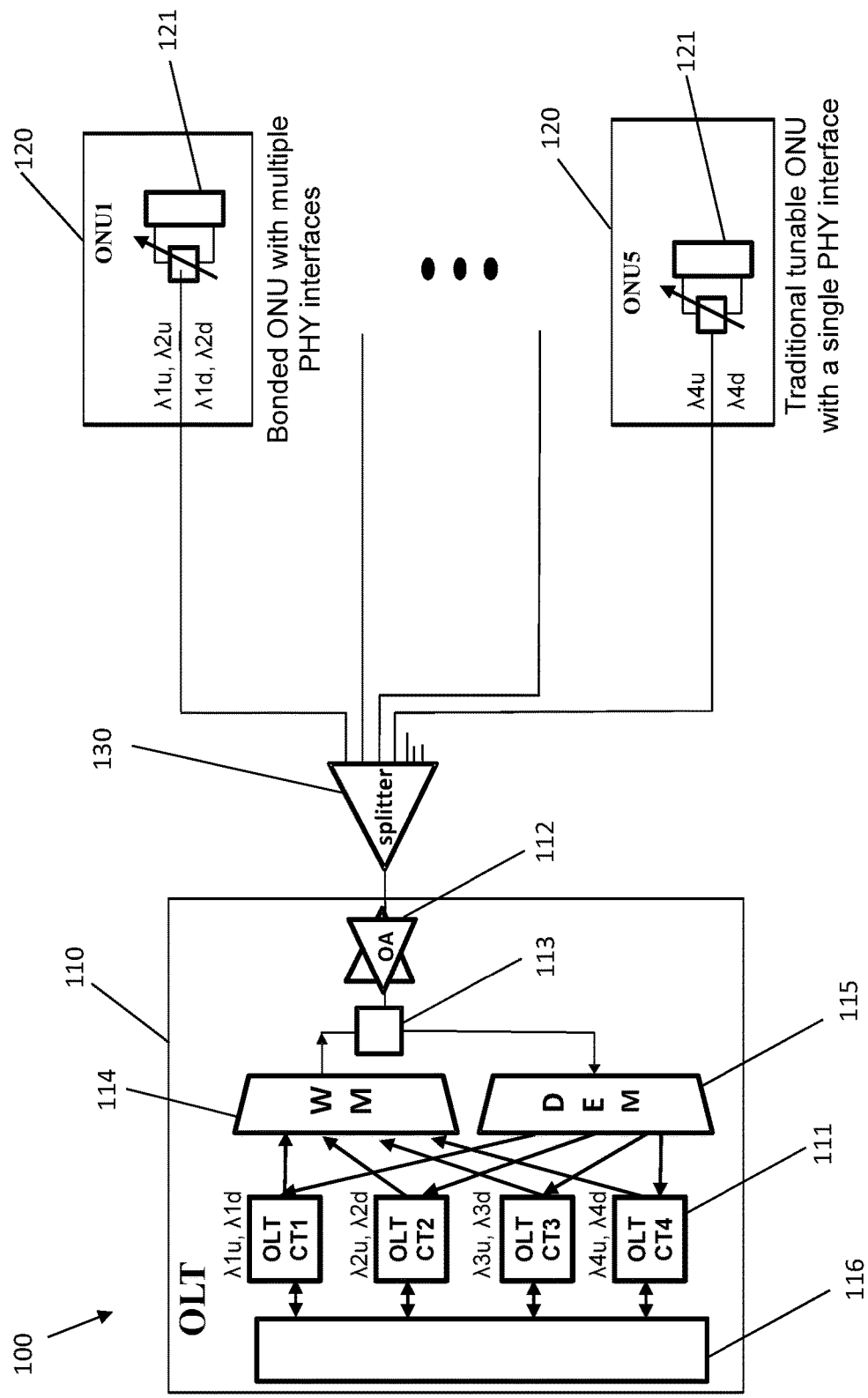
FIG. 1 is a schematic diagram of an embodiment of a time- and wavelength-division multiplexed PON (TWDM-PON) system architecture.

FIG. 1 is a schematic diagram of an embodiment of a time- and wavelength-division multiplexed PON (TWDM-PON) system architecture 100 having an OLT 110 comprising four OLT ports or OLT channel terminations (CTs) 111. In various embodiments, the OLT 110 can further comprise an operational amplifier 112 and a circulator 113 for separating upstream and downstream communications. The TWDM-PON system 100 can also include multiple ONUs 120 in communication with the OLT 110 via a splitter 130. Each ONU 120 can transmit and/or receive data with the OLT 110, where each ONU 120 may be configured to communicate using a single wavelength or using multiple wavelengths. The TWDM-PON has been selected as the solution for the next generation PON with a minimum capacity of 40 Gb/s. In a typical TWDM-PON system, there are up to eight wavelengths in both upstream and downstream directions, and the ONUs can tune their wavelengths to any operational channel. However, there may be more or less than eight wavelengths in a system, and the embodiments disclosed herein are not limited to a specific number of wavelengths.

In an embodiment, the OLT 110 comprises any device configured to communicate with the ONUs 120 and another network (not shown). Specifically, the OLT 110 acts as an intermediary between the other network and the ONUs 120. For instance, the OLT 110 forwards data received from the network to the ONUs 120, and forwards data received from the ONUs 120 onto the other network via a system network interface (SNI). Although the specific configuration of the OLT 110 may vary depending on the type of PON 100, in one embodiment, the OLT 110 comprises a transmitter and a receiver, a wavelength division multiplexing multiplexer (WDM MUX) 114 for multiplexing signals over a plurality of wavelengths, a demultiplexer 115 for demultiplexing a signal of a plurality of wavelengths, and a media access controller (MAC) 116 for controlling packet encoding/decoding on an optical signal. When the other network uses a network protocol, such as Ethernet or Synchronous Optical Networking/Synchronous Digital Hierarchy (SONET/SDH), which differs from the PON protocol used in the TWDM-PON system 100, the OLT 110 further comprises a converter that converts the network protocol into the PON protocol. The OLT 110 converter also converts the PON protocol into the network protocol. The OLT 110 is typically located at a central location, such as a central office, but may be located at other locations as well in alternative embodiments.

In an embodiment, the ONUs 120 comprise any devices that are configured to communicate with the OLT 110 and a customer or user via a user network interface (UNI). Specifically, the ONUs 120 acts as an intermediary between the OLT 110 and the customer. For instance, the ONUs 120 forwards data received from the OLT 110 to the customer and forwards data received from the customer onto the OLTs 110. Although the specific configuration of the ONUs 120 may vary depending on the type of TWDM-PON system 100, in one embodiment, the ONUs 120 comprise an optical transmitter configured to send optical signals to the OLT 110, an optical receiver configured to receive optical signals from the OLT 110, and a MAC 121 for controlling packet encoding/decoding. In some embodiments, the optical signals are sent in a burst mode. In embodiments in which a plurality optical signals sharing a common wavelength are to be sent, the optical signals employ a common transmission channel. Additionally, the ONUs 120 further comprise a converter (not shown) that converts the optical signal into electrical signals for the customer, such as signals in Ethernet or asynchronous transfer mode (ATM) protocol, and a second transmitter and/or receiver that sends and/or receives the electrical signals to and/or from a customer device. In some embodiments, ONUs 120 and optical network terminals (ONTs) are similar, and thus the terms are used interchangeably herein. The ONUs 120 are typically located at distributed locations, such as the customer premises, but may be located at other locations as well in alternative embodiments.

Figure 2:
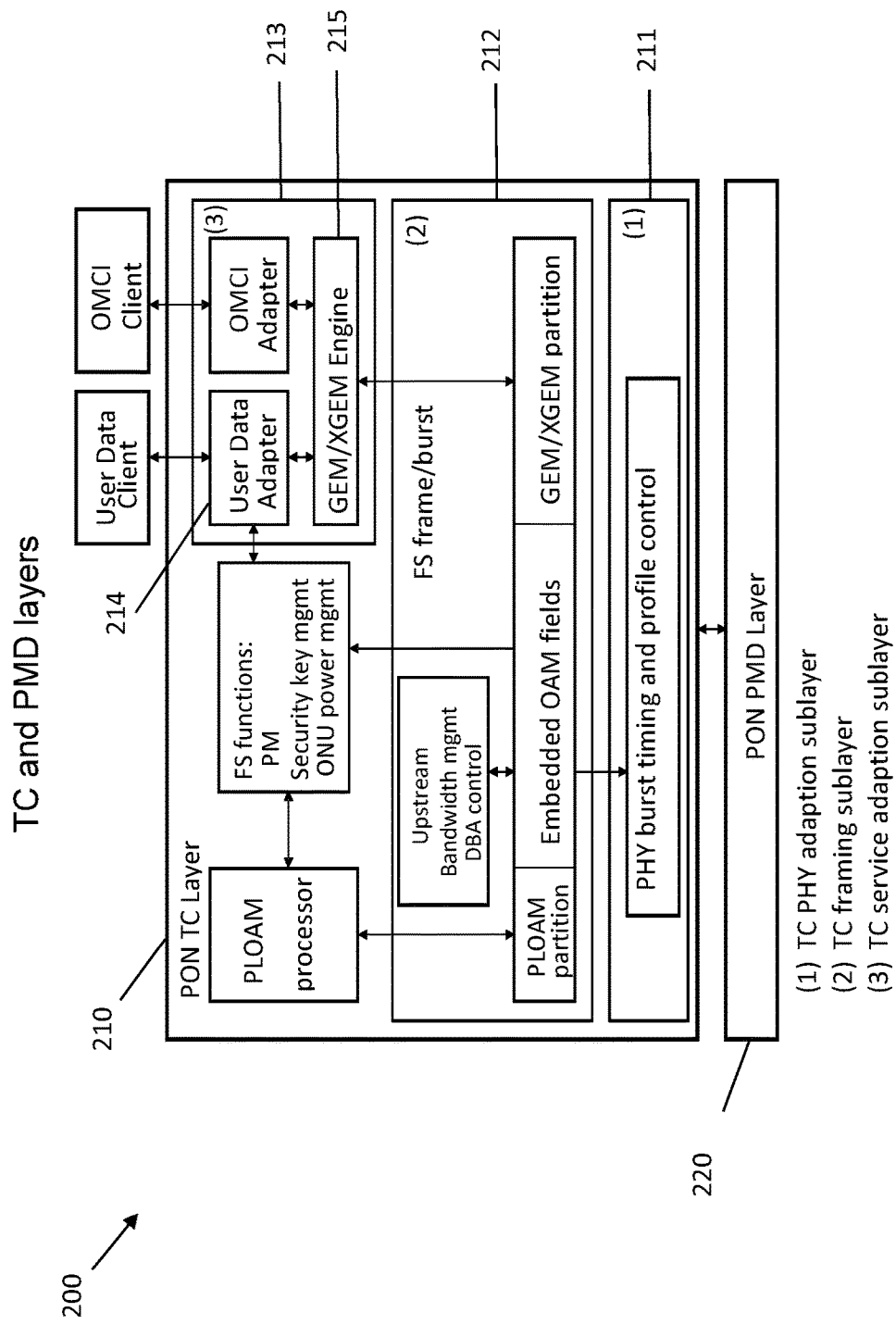
FIG. 2 illustrates an exemplary PON layer representation architecture.

FIG. 2 illustrates a PON layer 200 according to an embodiment. The PON layer 200 may employ G-PON encapsulation method (GEM) and XG-PON encapsulation method (XGEM) for data fragmentation, encapsulation, and delineation. The PON layer 200 may comprise a PON transmission convergence (TC) layer 210 and a PON physical media dependent (PMD) layer 220. Further, the PON TC layer 210 may include a TC physical adaption sublayer 211, a TC framing sublayer 212, and a TC service adaptation sublayer 213. As shown in FIG. 2, the TC service adaptation sublayer 213 may include the user data adapter 214 and a GEM/XGEM engine 215 in the PON TC layer 210. The GEM/XGEM engine 215 is in communication with the TC framing sublayer 212 and, in turn, the TC physical adaption sublayer 211. Specifically, the PON layer 200 is configured to communicate using a single frame sublayer and a single PMD layer with single wavelength channel capacity. The PON TC layer 210 and the TC physical adaption sublayer 211 operate as described in ITU-T Recommendations G.987.3 and G.989.3, which are incorporated herein by reference.

In a typical transmission method, at the sender side (the OLT in the downstream transmission, or the ONU in the upstream transmission), data, such as user data, is first fragmented into pieces and encapsulated in GEM/XGEM frames. Each GEM/XGEM frame may contain a fixed size header and a variable size payload. The PON layer on the sender side further adds one or more GEM/XGEM frames into the framing sublayer frame/burst payload, and transmits the data to the receiver. Furthermore, at the receiver side (the ONU in the downstream transmission, or the OLT in the upstream transmission), the data is reassembled from the GEM/XGEM frames based on the GEM/XGEM port-ID in the GEM/XGEM frame headers. In a typical system, G-PON and XG-PON have a similar information flow as a TWDM-PON.

As described above, a typical OLT or ONU contains one TC PHY adaptation sublayer, one TC framing sublayer and one service adaptation sublayer in the PON TC layer. However, it may be desirable to have higher data rate capacity in excess of the single wavelength channel capacity. One possible manner of obtaining the higher data rate capacity is by extending the OLT or ONU with the capability of terminating two or more wavelength channels simultaneously, thereby achieving a data rate higher than a single physical channel capacity.

In accordance with various embodiments, a PON system is configured for PON TC layer multiple data resource aggregation. In various embodiments, a transmission method of a PON layer comprises aggregating data from multiple wavelength channels in a single OLT or ONU, rather than a single wavelength into a prior art ONU. By way of example, the various embodiments will be discussed with reference to a TWDM-PON with multiple wavelengths, though the invention is not limited to this system.

Figure 3:
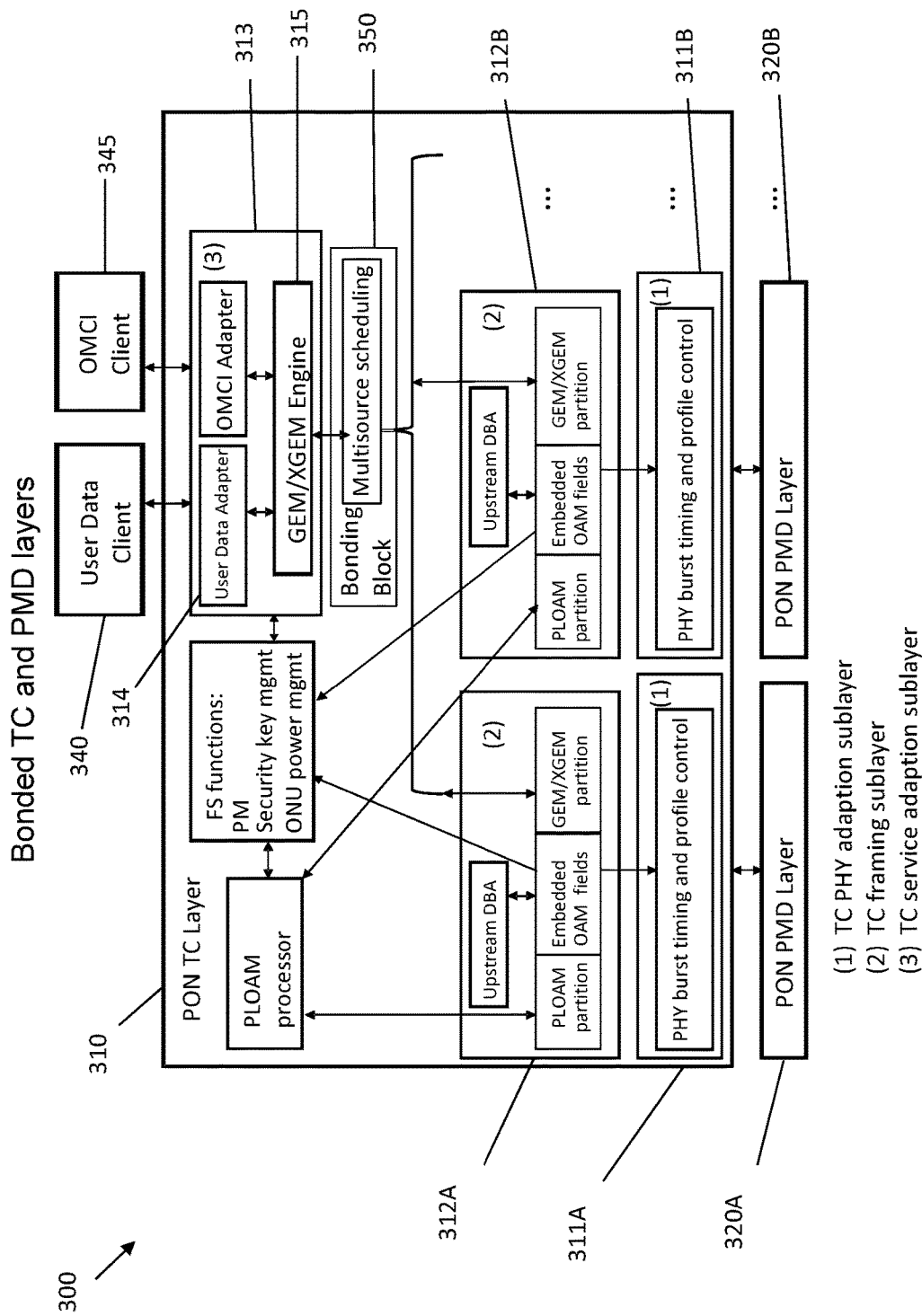
FIG. 3 illustrates a second exemplary PON layer representation architecture.

In various embodiments and with reference to FIG. 3, a PON layer representation 300 is similar to PON layer representation 200 as described above, but further comprises a bonding block 350 and multiple TC physical adaption sublayers and TC framing sublayers. Specifically, the PON layer representation 300 comprises a first PON PMD layer 320A, a second PON PMD layer 320B, and a PON TC layer 310. Further, the PON TC layer 310 may include a first TC physical adaption sublayer 311A, a second TC physical adaption sublayer 311B, a first TC framing sublayer 312A, a second TC framing sublayer 312B, a TC service adaptation sublayer 313, and the bonding block 350. It will be appreciated that the first TC physical adaption sublayer 311A and the first TC framing sublayer 312A are associated with a first wavelength channel, and that the second TC physical adaption sublayer 311B and the second TC framing sublayer 312B are associated with a second wavelength channel. Though FIG. 3 shows two PON PMD 320 layers, two TC physical adaption sublayers 311, and two TC framing sublayers 312, the disclosure is not limited to such and can have multiple of such components to facilitate the multiple wavelength channels. The TC service adaptation sublayer 313 may include a user data adapter 314 and GEM/XGEM engine 315 functions. The GEM/XGEM engine 315 is in communication with the bonding block 350. The bonding block 350 is in communication with the first and second TC framing sublayers 312A, 312B and, in turn, the first and second TC physical adaption sublayers 311A, 311B.

Available data rates can be increased using TWDM PONs by multiplexing different wavelengths. The TWDM communication can be implemented by a multiple-channel PON layer, as illustrated in FIG. 3. The multiple TC framing sublayers 312A, 312B and TC physical adaptation sublayers 311A, 311B aggregate or de-aggregate multiple data sources. For purposes of this disclosure, reference will be made to an OLT, though the PON TC layer 310 can be part of an OLT or ONU. The exemplary OLT PON TC layer 310 is configured to support data rate service higher than 10 Gb/s. The OLT comprises a single TC service adaptation sublayer 313 to handle the data (such as data exchanged with a user data client 340) and OMCI adaptation data (such as OMCI adaption data exchanged with an OMCI client 345).

In accordance with various embodiments, the bonding block 350, which may be referred to as a multisource scheduling module, schedules the transmission of encapsulated frames, such as GEM/XGEM frames, to the multiple associated framing sublayers at the sender side. At the receiver side, a corresponding receiver's bonding block schedules the GEM/XGEM frames from framing sublayers to be received and processed by a corresponding receiver's GEM/XGEM engine. The multisource scheduling module can also determine the order to distribute and process the GEM/XGEM frames. In various embodiments, the bonding block 350 schedules transmission of the GEM/XGEM frames on multiple channels, and selects an order for transmitting the frames. The order for transmitting the frames is based in part on availability of individual channels. The transmission scheduling of the frames may include transmitting fragments in a sequential order. All fragments of a first packet are transmitted before transmitting any fragment of a subsequent packet, and so on. The various fragments may be transmitted using the multiple channels as the next channel becomes available. The fragments of a packet can be transmitted over one or more of the multiple channels, substantially in parallel.

Figure 4:
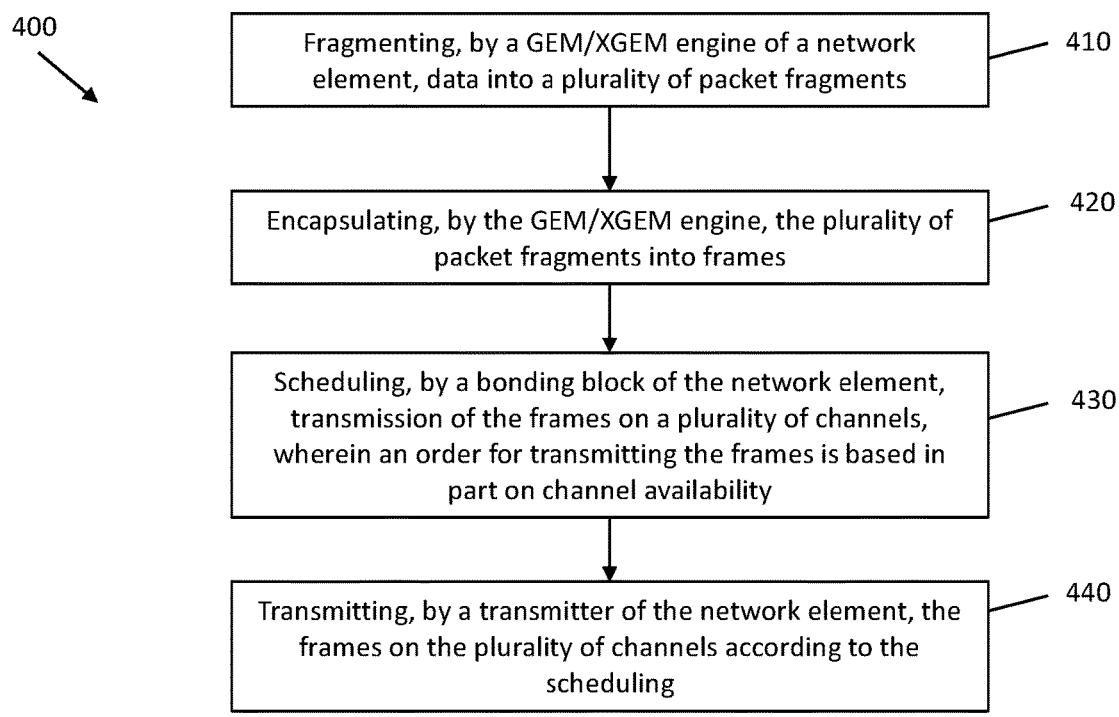
FIG. 4 illustrates a flowchart of an exemplary method of PON channel bonding.

FIG. 4 is a flowchart 400 of a method of PON channel bonding according to an embodiment. With reference to FIG. 4, an exemplary method 400 of PON channel bonding via a TC layer extension comprises fragmenting, by a GEM/XGEM engine of a network element, data into a plurality of packet fragments 410; encapsulating, by the GEM/XGEM engine, the plurality of packet fragments into frames 420; scheduling, by a bonding block of the network element, transmission of the frames on a plurality of channels, wherein an order for transmitting the frames is based in part on channel availability 430; and transmitting, by a transmitter of the network element, the frames to a receiver on the plurality of channels according to the scheduling 440. The frames are transmitted via arrival-time driven scheduling in some examples. Moreover, in an exemplary embodiment, the OLT with multi-channel bonding functionality adheres to the International Telecommunication Union (ITU-T) G.989.1 standard, amendment 1. In one embodiment, the GEM/XGEM engine can fragment user data into fixed-size packet fragments to facilitate bonding. For example, a group of aggregated data can be fragmented into 64-byte packet fragments. The last fragment can be padded to 64 bytes if the last fragment's payload is shorter than 64 bytes. The padding helps the GEM/XGEM engine at the receiver side to reassemble the GEM/XGEM frames back to the original data unit. Note that fixed-size fragment other than 64 bytes are also possible.

For example, in a TWDM-PON system, two or more wavelength channels can be bonded to support services with a rate beyond 10 Gb/s. In a first example, the scheduling scheme can be round-robin based on the bonded wavelength channel identification. As an example, assume wavelength channels with IDs #1, #2, #3 are bonded. At the sender side, the GEM/XGEM engine encapsulates user data from the high rate service into GEM/XGEM frames and forwards the GEM/XGEM frames to the bonding block. In a first scheduling cycle, the first GEM/XGEM frame is sent to the framing sublayer associated with wavelength channel #1, the second GEM/XGEM frame goes to the framing sublayer associated with wavelength channel #2, the third GEM/XGEM frame is sent to the framing sublayer associated with wavelength channel #3. In the next scheduling cycle, the fourth GEM/XGEM frame goes to the framing sublayer associated with wavelength channel #1, the fifth GEM/XGEM frame goes to the framing sublayer associated with wavelength channel #2, the sixth GEM/XGEM frame goes to the framing sublayer associated with wavelength channel #3, etc. At the receiver side, the bonding block follows the same round-robin order in forwarding the GEM/XGEM frames from the framing sublayers to the GEM/XGEM engine.

In another embodiment, the GEM/XGEM engine can fragment data into variable-size packet fragments. In this embodiment, the transmission scheduling can be determined by the XGEM receiving time at the receiver. The transmission may take the channel available time, channel capability, frame transmission time, and/or frame arrival time into consideration. Therefore, its transmission can have a higher complexity than that of fixed-size fragmentation.

Figure 5:
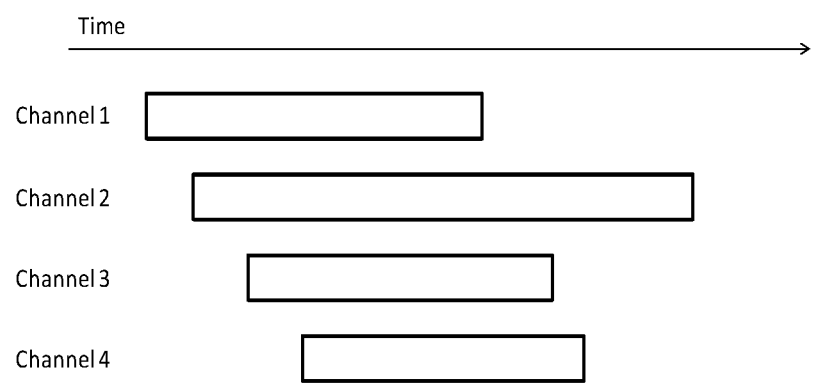
FIG. 5 illustrates a representation of available channels in multiple channel communications.

In various embodiments, encapsulated frame transmission over multiple channels may be based on various algorithms. One example is based on XGEM operation over multiple channels with user packets that are encapsulated in XGEM frames with variable size. In this example, there are N physical PON channels working as a combine channel (CC) for the ONU XGEM traffic entity in question. These physical channels can be time-aligned to a high precision by virtue of the XGTC framing, which defines a frame structure and a superframe structure. The time alignment can be done by delaying each of the channels until the downstream physical layer synchronization blocks (PSBd) or its corresponding time in the upstream (PSBu) are the same. Even given this alignment, all the channels may not be ready to send at the same time. In general, each channel will become available at a certain time Tstart[i]. These can be sorted in ascending order, so that Tstart[0]<Tstart[1]< . . . <Tstart[n] as shown in FIG. 5. FIG. 5 illustrates a representation of available channels in multiple channel communications. Additionally, the channels may have an enforced maximum amount of payload that can be accommodated (the Payload Length). In the upstream direction, these are explicitly given in the bandwidth maps of the associated channels. In the downstream direction, the start time is determined by the current state of usage of the downstream channels (that is, the packets that went before), and the stop time would be the end of the current frame. With this perspective in mind, the combined channels appear as a set of first-in, first-out (FIFO) buffers. The buffer view is useful, because each of the OLTs or ONUs may be running at a certain rate of drain. Once the various channels are sorted, the bonded traffic may be scheduled, for example according to the methods shown in FIGS. 6, 7, and 8.

One design feature of the disclosed XGEM is that once a fragment's header is received, the reassembly process knows where to put the remaining data into its packet reassembly buffer. More importantly, the XGEM knows where that fragment will end, and thus where the next fragment will begin if the next fragment is a continuation of the current packet. Alternatively, if the current fragment is marked as the last fragment, then the receiver knows that the next fragment will belong to another packet. This aspect is quite different from other packet transport protocols where the packet length is not known a-priori and is learned once the packet ends. Given this design feature of XGEM, the next XGEM header is put into the earliest available channel in order for the receiver to automatically get the headers in the correct order, and thus the perform the reassembly process.

Figure 6:
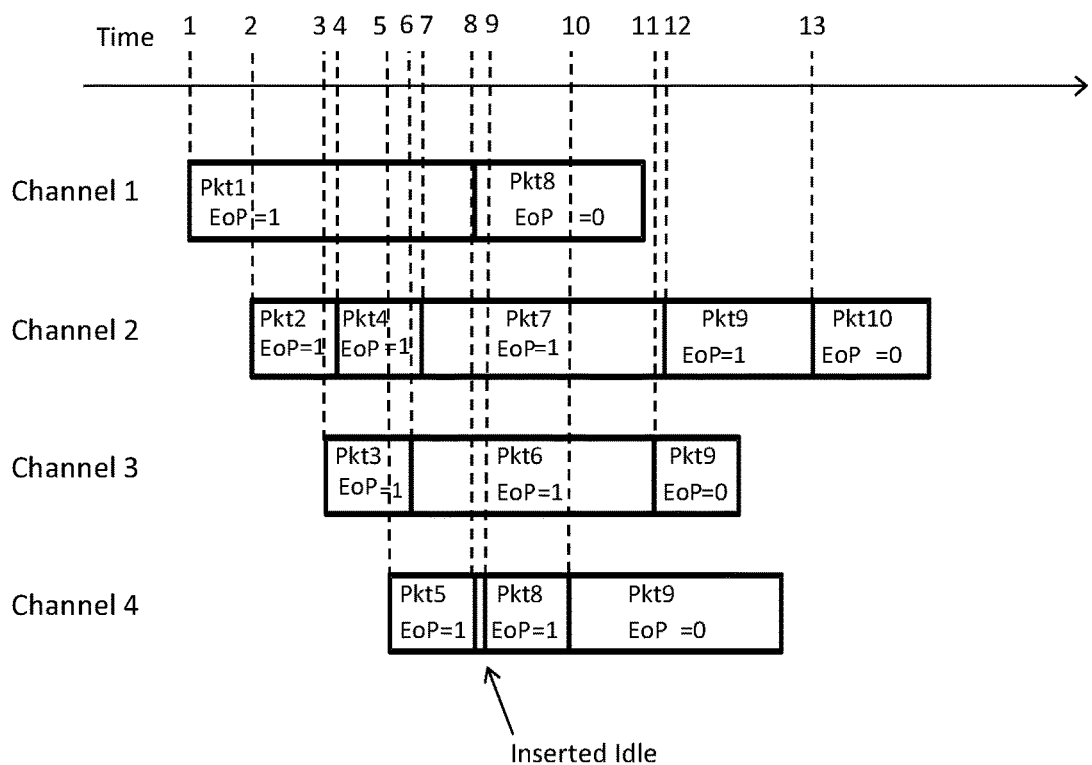
FIG. 6 illustrates a first embodiment timing diagram of communicating data packet fragments over multiple channels.

Some examples of the arrangement of fragments as a result of this process are shown in FIG. 6, which illustrates how the next fragment is sent in the next available channel. FIG. 6 illustrates a first embodiment timing diagram of communicating data packet fragments over multiple channels. In this example, ten packets (Pkt 1 through Pkt 10) are carried in a total of thirteen fragments. Since the receiver considers a fragment 'arrived' when its header arrives, the beginning of each fragment (where the header is) is the relevant moment in time. These moments are shown in FIG. 6 with the dashed lines running up to the time axis. A packet fragment has an End of Packet (EoP) indicator with a value of "0" when the packet fragment is not the last packet fragment, and an EoP value of "1" when the packet fragment is the last packet fragment. By inspecting these, we can see that the fragments are received in the following order:

Time 1: Pkt 1, EoP="True" (1) on channel 1
Time 2: Pkt 2, EoP=1 on channel 2
Time 3: Pkt 3, EoP=1 on channel 3
Time 4: Pkt 4, EoP=1 on channel 2
Time 5: Pkt 5, EoP=1 on channel 4
Time 6: Pkt 6, EoP=1 on channel 3
Time 7: Pkt 7, EoP=1 on channel 2
Time 8: Pkt8, EoP=0 (Not the end of the packet) on channel 1
Time 9: Pkt8, EoP=1 on channel 4
Time 10: Pkt9, EoP=0 on channel 4
Time 11: Pkt9, EoP=0 on channel 3
Time 12: Pkt9, EoP=1 on channel 2
Time 13: Pkt 10, EoP=0 on channel 2 (this packet would be continued in the next frame).

As illustrated in FIG. 6, the packet fragments are all in order, and the normal reassembly process can work unimpeded. At time 8, Channels 1 and 4 are available at exactly the same time. To break this degeneracy, one of the channels can be intentionally occupied with an idle XGEM header. The idle header provides that no matter which channel is considered "first" by the receiver, the fragment assembly will continue to operate correctly. In alternative embodiments, the channels can be numbered sequentially, and in cases of degeneracy, the lower numbered channel can be selected first by rule. The process of selecting a channel when multiple channels are available can be determined by a preset operation rule. The process will continue to operation without issue as long as both the transmitter and receiver apply the same operation rule.

Figure 7:
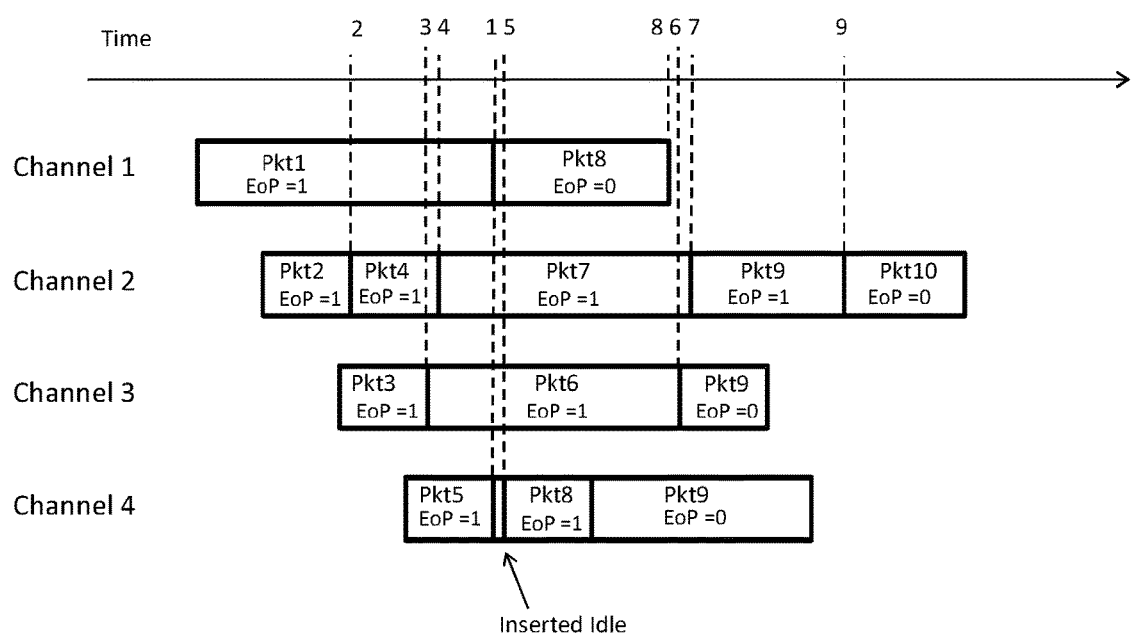
FIG. 7 illustrates a second embodiment timing diagram of communicating data packet fragments over multiple channels.

The above algorithm is configured for the maximum utilization of the channel because it uses the minimum number of XGEM headers to encapsulate the data packets. It should be noted, however, that the reassembled packets may need to be forwarded to the upper layer in this enforced order. This means that some packets must be delayed (held in their reassembly buffer) until all preceding packets are finished. This is illustrated in FIG. 7, where the dashed lines show the relevant times of packet completion. FIG. 7 illustrates a second embodiment timing diagram of communicating data packet fragments over multiple channels. The illustrated sequence of packet completion in this example is: 2, 3, 4, 1, 5, 8, 6, 7, and 9. Thus, to enforce the packet ordering, packets 2, 3, and 4 wait until packet 1 is completed, and packet 8 waits until packets 6 and 7 are completed. In practice, the packets are "forwarded" to the user by transferring a buffer descriptor to the user process in order to simplify this packer order enforcement.

Figure 8:
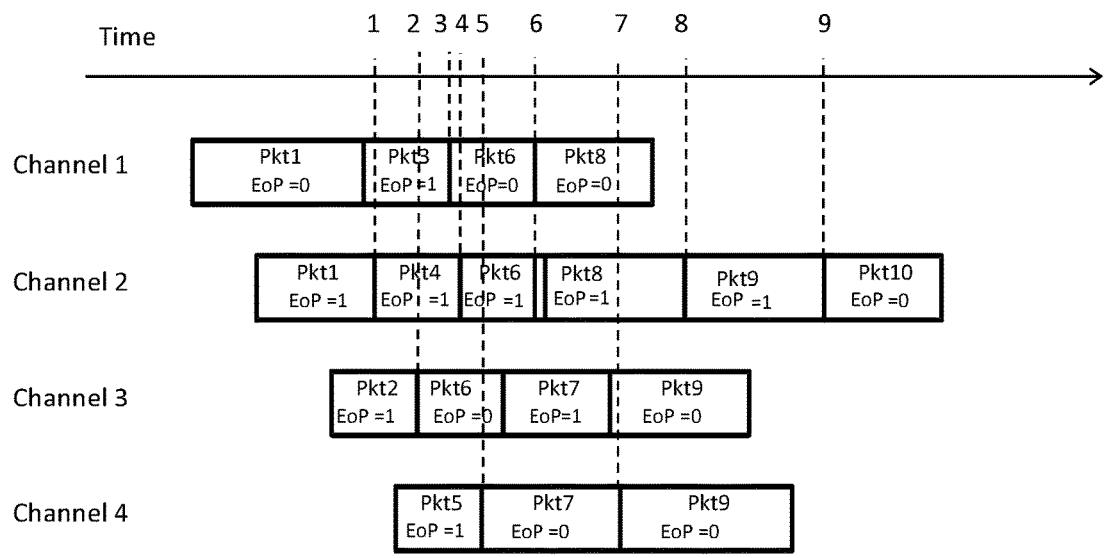
FIG. 8 illustrates a third embodiment timing diagram of communicating data packet fragments over multiple channels.

In various embodiments, it may be desirable in certain applications to minimize the latency of the channel. In these cases, the user packets should be delivered as quickly as possible. In various embodiments and with reference to FIG. 8, FIG. 8 illustrates a third embodiment timing diagram of communicating data packet fragments over multiple channels. The minimal latency can be achieved by following the more complex algorithm wherein a packet would be fragmented over two or more channels if it results in quicker transmission. In an exemplary process, larger packets can be broken into smaller fragments in order to be transmitted in parallel over multiple channels. The exemplary process may include a predetermined minimum packet size to avoid creating very small fragments and the associated inefficient overhead. Packets that are smaller than the predetermined minimum packet size may not be fragmented, and are transmitted whole in such an embodiment. Further, in various embodiments and as shown by the fine tracing lines in FIG. 8, implementation of a delay-optimized algorithm operates such that the sequence of packet completions is in order. Correspondingly, the receiver may not be required to manage packet order enforcement, with the lack of packet order enforcement increasing the rate of packet completion.

In various embodiments, the receiving packet order can also be enforced via adding, by the PON layer, a sequence number to the packet fragments. For example, the XGEM header may already have a Last Fragment (LF) indicator, and a sequence number can be added to the XGEM header so that the receiver can reassemble the XGEMs into the user data packets and forward them in the proper order.

Figure 9:
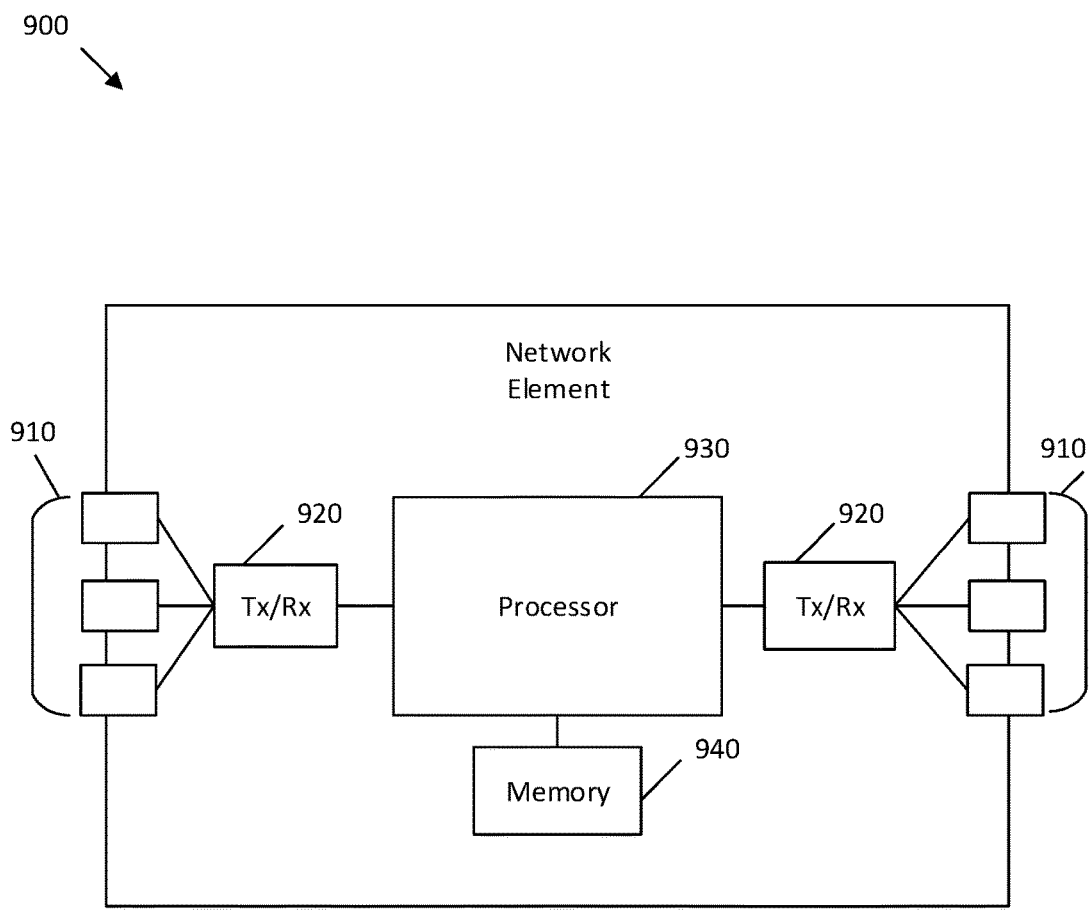
FIG. 9 is a schematic diagram of a network element.

FIG. 9 is a schematic diagram of a network element 900 for channel bonding in a multiple-channel PON system. The network element 900 may be suitable for implementing any of the disclosed embodiments. For instance, the network element 900 may implement an OLT or an ONU, and may execute the layers, components, and/or functions described with respect to FIGS. 2 and 3. Network element 900 comprises ports 910, transceiver units (Tx/Rx) 920, a processor 930, and a memory 940. Ports 910 are coupled to Tx/Rx 920, which may be transmitters, receivers, or combinations thereof. The Tx/Rx 920 may transmit and receive data via the ports 910. Processor 930 is coupled to the Tx/Rx 920 and is configured to execute the instructions and process data. Memory 940 is coupled to the processor 930 and is configured to store data and instructions for implementing embodiments described herein. The processor 930 can obtain and execute the instructions stored in the memory 940. The network element 900 may also comprise electrical-to-optical (EO) components and optical-to-electrical (OE) components coupled to the ports 910 and Tx/Rx 920 for receiving and transmitting electrical signals and optical signals.

The processor 930 may be implemented by hardware and software. The processor 930 may be implemented as one or more central processing unit (CPU) chips, logic units, cores (e.g., as a multi-core processor), field-programmable gate arrays (FPGAs), application specific integrated circuits (ASICs), or digital signal processors (DSPs). The processor 930 is in communication with the ports 910, Tx/Rx 920, and memory 940.

The memory 940 comprises one or more of disks, and solid-state drives and may be used as an over-flow data storage device, to store programs when such programs are selected for execution, and to store instructions and data that are read during program execution. The memory 940 may be volatile and/or non-volatile and may be read-only memory (ROM), random-access memory (RAM), ternary content-addressable memory (TCAM), or static random-access memory (SRAM).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of fragmented packet transmission in a multiple-channel passive optical network (PON), comprising:
    fragmenting, by a Gigabit-PON encapsulation method (GEM)/next generation-PON encapsulation method (XGEM) engine of a network element, data into a plurality of packet fragments;
    encapsulating, by the GEM/XGEM engine, the plurality of packet fragments into frames;
    scheduling, by a bonding block of the network element, transmission of the frames on a plurality of bonded channels by transmitting packet fragments in a sequential order, wherein all packet fragments of a first packet are transmitted before transmitting any packet fragment of a subsequent packet, and wherein an order for transmitting the frames is based in part on channel availability; and
    transmitting, by a transmitter of the network element, the frames on the plurality of bonded channels according to the scheduling.

2. The method of claim 1, wherein a next packet fragment is transmitted in a next available channel of the plurality of bonded channels.

3. The method of claim 2, further comprising transmitting an idle header in a secondary channel when the secondary channel and the next available channel are available for communications at the same time.

4. The method of claim 2, wherein scheduling the transmission of the frames applies a round-robin format through the plurality of bonded channels.

5. The method of claim 1, wherein scheduling the transmission of the frames is determined by the frame receiving time at a receiver, and wherein the frame receiving time at the receiver is calculated based on one or more of channel available time, channel capability, frame transmission time, or frame arrival time.

6. The method of claim 1, wherein fragmenting the data comprises the GEM/XGEM engine fragmenting the data into variable-size packet fragments, wherein each frame includes a fixed size header and a variable size payload, and wherein the frames are GEM/XGEM frames.

7. The method of claim 1, wherein fragmenting the data comprises the GEM/XGEM engine fragmenting the data into fixed-size packet fragments, wherein each frame includes a fixed size header and a fixed size payload, and wherein the GEM/XGEM engine pads a fragment payload to meet a predetermined payload length when the fragment payload is less than the predetermined payload length.

8. A network element configured to generate a multiple-channel passive optical network (PON) layer, comprising:
    a non-transitory memory storage comprising instructions;
    one or more processors in communication with the memory, wherein the one or more processors execute the instructions to:
        fragment data into a plurality of packet fragments;
        encapsulate the plurality of packet fragments into one or more frames; and
        schedule transmission of the one or more frames on a plurality of channels via a transmission schedule, wherein an order for transmitting the frames is based in part on channel availability;
    a plurality of physical adaptation sublayers and a plurality of framing sublayers each corresponding to the plurality of channels; and
    a transmitter in communication with the one or more processors and configured to transmit the one or more frames on the plurality of channels according to the transmission schedule.

9. The network element of claim 8, wherein the one or more processors execute the instructions to generate the PON layer.

10. The network element of claim 8, wherein the one or more processors execute the instructions to generate the PON layer including a service adaptation sublayer which fragments the data into the plurality of packet fragments and encapsulates the plurality of packet fragments into the one or more frames, and including a bonding block that creates the transmission schedule.

11. The network element of claim 10, wherein the service adaptation sublayer includes a G-PON encapsulation method (GEM)/next generation-PON encapsulation method (XGEM) engine.

12. The network element of claim 10, wherein the bonding block schedules the transmission of the frames by transmitting packet fragments in a sequential order, wherein all packet fragments of a first packet are transmitted before transmitting any subsequent packet fragments of a subsequent packet.

13. The network element of claim 12, wherein a next packet fragment is transmitted in a next available channel of the plurality of channels.

14. The network element of claim 13, wherein the bonding block is further configured to transmit an idle header in a secondary channel when the secondary channel and the next available channel are available for communications at the same time.

* * * * *

UNITED STATES PATENT AND TRADEMARK OFFICE
CERTIFICATE OF CORRECTION

PATENT NO. : 10,177,871 B2
APPLICATION NO. : 15/205930
DATED : January 8, 2019
INVENTOR(S) : Yuanqiu Luo et al.

Page 1 of 1

It is certified that error appears in the above-identified patent and that said Letters Patent is hereby corrected as shown below:

Under item (56), Page 2, Column 2, Other Publications, Lines 21-25, should read:
"SERIES G:TRANSMISSION SYSTEMS AND MEDIA, DIGITAL SYSTEMS AND NETWORKS, Digital sections and digital line system - Optical line systems for local and access networks, Gigabit-capable Passive Optical Networks (G-PON): ONT management and control interface specification," ITU-T, G.984.4, Part 1, Feb. 2008, 215 pages.

Signed and Sealed this
Twelfth Day of February, 2019

Andrei Iancu
*Director of the United States Patent and Trademark Office*